United States Patent
Altinger et al.

(10) Patent No.: US 10,437,245 B2
(45) Date of Patent: Oct. 8, 2019

(54) APPARATUS FOR CONTROLLING A DEVICE OF A MOTOR VEHICLE, ASSOCIATED DEVICE AND OPERATING METHOD

(71) Applicant: AUDI AG, Ingolstadt (DE)

(72) Inventors: Harald Altinger, Gerolfing (DE);
Florian Schuller, Ismaning (DE);
Ahmad El Assaad, Nürnberg (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/323,890

(22) PCT Filed: Jul. 3, 2015

(86) PCT No.: PCT/EP2015/001348
§ 371 (c)(1),
(2) Date: Jan. 4, 2017

(87) PCT Pub. No.: WO2016/005040
PCT Pub. Date: Jan. 14, 2016

(65) Prior Publication Data
US 2017/0146993 A1     May 25, 2017

(30) Foreign Application Priority Data
Jul. 5, 2014   (DE) .......................... 10 2014 010 002

(51) Int. Cl.
G05D 1/00     (2006.01)
H04W 4/80     (2018.01)
(Continued)

(52) U.S. Cl.
CPC .......... *G05D 1/0022* (2013.01); *B60W 30/06* (2013.01); *B62D 15/0285* (2013.01); *H04W 4/80* (2018.02)

(58) Field of Classification Search
None
See application file for complete search history.

(56) References Cited

U.S. PATENT DOCUMENTS 5,574,969 A * 11/1996 Olds ................. H04B 7/18539
455/429
5,752,164 A * 5/1998 Jones ....................... H04B 1/38
379/29.01

(Continued)

FOREIGN PATENT DOCUMENTS

DE     20 2005 014 136      2/2006
DE     10 2008 007 223      8/2008
(Continued)

OTHER PUBLICATIONS

English translation of Dearborn.*
(Continued)

*Primary Examiner* — Jean Paul Cass
(74) *Attorney, Agent, or Firm* — Henry M. Feiereisen LLC

(57) ABSTRACT

Apparatus for controlling a device of a motor vehicle includes a communication unit configured to shift the device of the motor vehicle from an idle mode to an active mode by sending a first wireless signal. The apparatus is configured to specify a frequency and/or a channel for transmitting and/or receiving the first wireless signal in the active mode and to control the device so that the device is only shifted from the idle mode to the active mode when the first wireless signal is received at the specified frequency and/or the specified channel.

11 Claims, 3 Drawing Sheets

Figure 1:
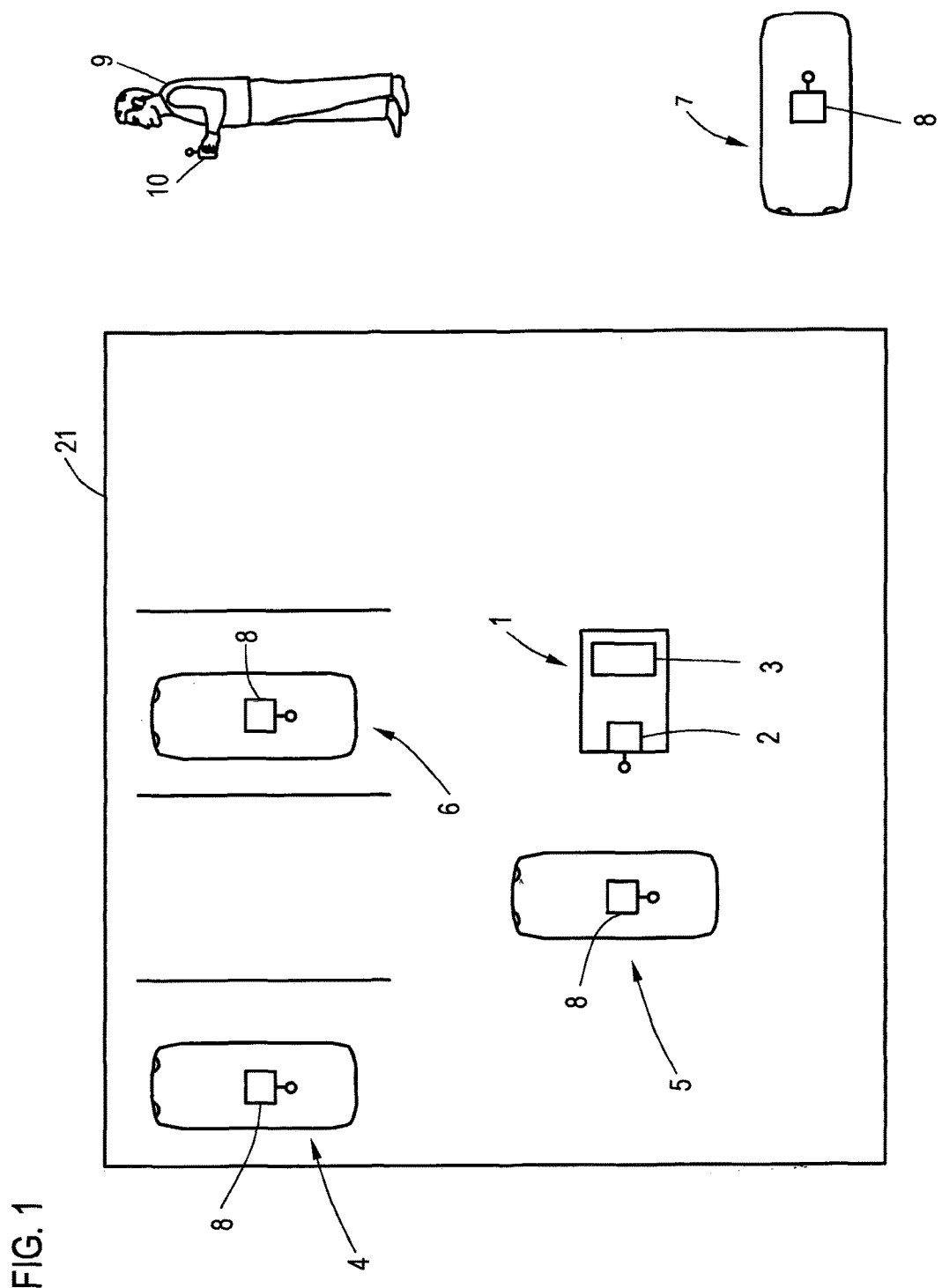

(51) Int. Cl.
*B62D 15/02* (2006.01)
*B60W 30/06* (2006.01)

(56) References Cited

U.S. PATENT DOCUMENTS

| | | | | |
|---|---|---|---|---|
| 5,903,226 A * | 5/1999 | Suman | ............... | G07C 9/00182 340/12.28 |
| 5,946,625 A * | 8/1999 | Hassan | ............... | H04B 7/2621 455/427 |
| 6,603,388 B1 * | 8/2003 | Perraud | ............. | G07C 9/00309 340/13.27 |
| 6,628,921 B1 * | 9/2003 | Vaddiparty | .......... | H04B 7/1851 455/12.1 |
| 7,099,638 B2 * | 8/2006 | Lyons | .................. | B60R 25/24 455/161.1 |
| 8,270,900 B2 * | 9/2012 | Parkman | ........... | H04B 7/18506 455/13.2 |
| 9,632,746 B2 * | 4/2017 | Keipert | .............. | G06F 3/165 |
| 9,655,217 B2 * | 5/2017 | Recker | ............. | H05B 37/0272 |
| 9,668,088 B2 * | 5/2017 | Quinn | ................. | H04W 16/14 |
| 9,762,282 B1 * | 9/2017 | Muellner | .......... | G06K 19/0723 |
| 10,367,677 B2 * | 7/2019 | Parkvall | ............. | H04L 41/0233 |
| 2002/0133716 A1 * | 9/2002 | Harif | ................. | G07C 9/00103 726/9 |
| 2003/0031191 A1 * | 2/2003 | El Wardani | ......... | H04L 12/2801 370/401 |
| 2003/0186662 A1 * | 10/2003 | Himmel | ............. | B60R 25/2081 455/185.1 |
| 2006/0202798 A1 * | 9/2006 | Baumgartner | ...... | B60R 25/2072 340/5.61 |
| 2007/0141984 A1 * | 6/2007 | Kuehnel | ................ | H04W 4/80 455/41.2 |
| 2007/0141986 A1 * | 6/2007 | Kuehnel | ............... | H04W 48/16 455/41.2 |
| 2007/0290881 A1 * | 12/2007 | Nikitin | ................... | G08C 17/02 340/12.22 |
| 2008/0007391 A1 * | 1/2008 | Potter | .................. | B60R 25/104 340/426.23 |
| 2008/0174446 A1 * | 7/2008 | Ghabra | ............... | B60R 25/2072 340/13.2 |
| 2008/0275990 A1 * | 11/2008 | Prasad | ................... | G06Q 10/00 709/225 |
| 2008/0288104 A1 | 11/2008 | Shani | | |
| 2009/0212906 A1 | 8/2009 | Michel et al. | | |
| 2010/0201481 A1 * | 8/2010 | Au | ........................ | G08C 17/02 340/5.51 |
| 2010/0271802 A1 * | 10/2010 | Recker | .............. | H05B 33/0803 362/20 |
| 2010/0327766 A1 * | 12/2010 | Recker | .................. | H02J 7/025 315/291 |
| 2011/0121654 A1 * | 5/2011 | Recker | .................. | H02J 9/065 307/66 |
| 2011/0133655 A1 * | 6/2011 | Recker | ..................... | H02J 9/02 315/159 |
| 2012/0026726 A1 * | 2/2012 | Recker | .................. | F21S 9/037 362/157 |
| 2012/0043889 A1 * | 2/2012 | Recker | ............... | H05B 33/0815 315/86 |
| 2012/0105219 A1 * | 5/2012 | Kofler | .................. | H04B 5/0062 340/426.16 |
| 2012/0106364 A1 * | 5/2012 | Kasslin | ................. | H04W 16/14 370/252 |
| 2012/0108179 A1 * | 5/2012 | Kasslin | ................. | H04W 16/14 455/67.13 |
| 2012/0119902 A1 * | 5/2012 | Patro | ....................... | H04L 12/12 340/502 |
| 2012/0230250 A1 * | 9/2012 | Kasslin | ................. | H04W 16/14 370/328 |
| 2012/0313750 A1 * | 12/2012 | Au | ......................... | G08C 17/02 340/5.61 |
| 2013/0231824 A1 * | 9/2013 | Wilson et al. | ....... | G05D 1/0278 701/26 |
| 2013/0315217 A1 * | 11/2013 | Chen | .................. | H04W 72/085 370/336 |
| 2014/0046506 A1 | 2/2014 | Reichel et al. | | |
| 2015/0217656 A1 * | 8/2015 | Loftus | .................. | H02J 7/0065 320/136 |
| 2015/0302742 A1 | 10/2015 | Schuller | | |
| 2015/0312953 A1 * | 10/2015 | Wang | ........................ | H04L 1/00 370/312 |
| 2016/0330825 A1 * | 11/2016 | Recker | ............... | H05B 37/0272 |
| 2016/0342379 A1 * | 11/2016 | Keipert | .................... | G06F 3/165 |
| 2017/0055077 A1 * | 2/2017 | Merricks | ................ | H04H 20/62 |
| 2017/0093210 A1 * | 3/2017 | Recker | .................... | H02J 9/065 |
| 2017/0127445 A1 * | 5/2017 | Lee | ..................... | H04L 43/0864 |
| 2017/0171741 A1 * | 6/2017 | Hannon | ................ | H04W 8/245 |
| 2017/0223712 A1 * | 8/2017 | Stephens | ................. | H04W 4/90 |
| 2017/0251404 A1 * | 8/2017 | Cummings | ........... | H04W 28/18 |

FOREIGN PATENT DOCUMENTS

| | | |
|---|---|---|
| DE | 10 2008 007 834 | 8/2008 |
| DE | 10 2010 052 099 | 7/2011 |
| DE | 10 2011 084 366 | 4/2013 |
| DE | 10 2012 007 986 | 10/2013 |
| DE | 10 2012 015 968 | 3/2014 |
| EP | 2 634 326 | 9/2013 |

OTHER PUBLICATIONS

International Search Report issued by the European Patent Office in International Application PCT/EP2015/001348.
Chinese Search Report dated May 3, 2018 with respect to counterpart Chinese patent application 2015800366970.
Translation of Chinese Search Report dated May 3, 2018 with respect to counterpart Chinese patent application 2015800366970.

* cited by examiner

APPARATUS FOR CONTROLLING A DEVICE OF A MOTOR VEHICLE, ASSOCIATED DEVICE AND OPERATING METHOD

The invention relates to an apparatus for controlling a device of a motor vehicle, wherein the apparatus has a communication unit that is configured to switch the device of the motor vehicle from an idle mode to an active mode by transmitting a wireless signal.

Vehicles normally switch most of their systems to idle mode after they have been turned off in order to save energy. In order to shift the vehicle back to an active mode from this idle mode, a wireless signal is sent to a transmitter at a specific frequency or on a channel through transmission of a signal for example. The received data are processed by a device of the motor vehicle, which device changes for this purpose from the idle mode to the active mode, and are compared with an internal key. When the sent key matches the internal key of the motor vehicle, the motor vehicle can be controlled by a transmitter. When the key does not match the internal key, i.e. when another vehicle is thus addressed by the transmitter, the device of the vehicle reverts back to the idle mode.

Particularly in the case of self-driving vehicles, it is necessary in regions with high vehicle density, for example a parking garage, to activate an automated parking operation by means of a transmitter, when a customer would like to have his vehicle made ready. Since in such cases, many vehicles are usually located together in a narrow space, the device of each vehicle must be activated, when the key is sent in order to determine whether the sent key matches the internal key. Since this is not the case for the individual vehicle when there is a plurality of vehicles, the device of the motor vehicle is often unnecessarily taken out of the idle mode, thereby wasting energy. This energy is at the expense of the main battery of the vehicle, which therefore has to be designed for example with greater capacity than is actually necessary.

The invention is therefore based on the object to provide an improved device in which energy is saved.

The object is attained by an apparatus of the aforementioned type which is provided in accordance with the invention such that a frequency and/or a channel for transmitting and/or receiving the wireless signal can be specified in the active mode.

Accordingly, a distinct frequency and/or a channel can be assigned to each motor vehicle in the region of the apparatus while the vehicle is in the active mode. The vehicle can then be shifted to the idle mode and must then be addressed at the specified frequency by a transmitter. The advantage of the invention is that each vehicle has assigned to it its own transmitting and/or receiving frequency. This avoids switching of all motor vehicles in the field of action of the apparatus from the idle mode to an active mode, when a wireless signal is transmitted. Instead, each vehicle is shifted to the active mode from the idle mode only when a wireless signal is transmitted at the specified frequency and/or the specified channel for the vehicle. This saves energy that would otherwise have to be spent as a result of the constant shifting of all vehicles from the idle mode to the active mode. Thus, for example, a battery of the motor vehicle can be configured with a lower capacity.

The frequency and/or the channel may be specified either by the apparatus or the device of the motor vehicle. The apparatus can involve a central server which assigns the respectively granted frequencies and/or channels to the motor vehicles. The central server has a communication unit by which the wireless signal can be transmitted. This signal can be received by the device of the motor vehicle. The device for the motor vehicle can involve any device which is configured for wireless communication. Thus, for example, existing modules of the motor vehicle can be used for transmission via Bluetooth, WLAN, NFC or mobile Internet. Alternatively, the communication can be realized via a mobile communication link.

Suitably, care should be taken that a sufficient number of channels are available in the used frequency band. In the example of a parking garage, this means that at least as many channels as parking spaces are available. Otherwise, a corresponding number of channels must be occupied several times. Even if this is required because of a limited available frequency band, this correspondingly reduces the energy consumption from unnecessarily activating all motor vehicles from the idle mode, since, unlike apparatuses known in the art, only a portion of the motor vehicles, and not all, are taken out from the idle mode.

Furthermore, it is advantageous that by assigning a specific frequency and/or a channel to each device of each vehicle in the receiving range of the apparatus, reception must only remain at the set frequency and/or the channel. Otherwise, the complete frequency spectrum would have to be scanned in order to be able to receive a possible signal. The energy demand can thus be significantly reduced in the idle mode.

An advantageous refinement of the invention provides that the apparatus is stationary. In a preferred embodiment, the apparatus is arranged in the region of a parking area, in particular in a parking garage. The apparatus can perform an automated parking of the motor vehicle, especially in the case of an automated parking operation in which a driver leaves his motor vehicle at the entrance of the parking garage and triggers a parking operation via the apparatus. For this purpose, it is expedient that the apparatus specifies a particular frequency at which the wireless signal is transmitted to the device of the motor vehicle.

Furthermore, it is particularly expedient that the apparatus is able to control the motor vehicle and/or a function of the motor vehicle, in particular, to park the motor vehicle, by means of at least one additional signal. Therefore, the apparatus can automatically park the vehicle, and then shift it to the idle mode. The frequency at which the wireless signal is transmitted can either be specified during entry into the parking garage or before parking the motor vehicle. Especially, when setting or specifying the frequency is already made at the entrance of the parking garage and also the additional signal, which is configured to control the motor vehicle and/or a function of the motor vehicle, is transmitted on the same frequency and/or the specified channel, already when entering the parking garage, it is possible to prevent unnecessarily shifting of other motor vehicles in the parking garage from the idle mode to the active mode.

A further embodiment of the invention can provide that a portable mobile handset, preferably in addition to the device of the motor vehicle, is configured to transmit and/or receive the wireless signal. The driver of the motor vehicle can also transmit and/or receive the wireless signal by means of this portable mobile handset, which can be configured as a separate unit or integrated in a key of the motor vehicle. This makes it possible for the apparatus to automatically trigger a parking operation, be it parking out or parking in. A specified frequency and/or a specified channel can thus also be stored in the mobile handset. A mobile telephone can be used particularly preferred as a portable mobile handset. The driver can thereby trigger a parking out operation of the vehicle by means of his mobile telephone. Furthermore, additional functions of the motor vehicle can be controlled via additional signals so that activation of the heating, the air-conditioning system or the multimedia system of the motor vehicle is possible.

The invention also relates to a device for a motor vehicle which is configured to receive a wireless signal by means of a communication unit, wherein an apparatus switches the motor vehicle from an idle mode to an active mode by sending the signal, wherein a frequency and/or a channel can be specified in the active mode for sending and/or receiving the wireless signal.

The device is thus arranged in the motor vehicle and can transmit and/or receive the wireless signal. The channel and/or the frequency at which the wireless signal is transmitted and/or received can thereby either be specified by the apparatus or by the device of the motor vehicle.

Furthermore, the invention relates to a method for shifting a device of a motor vehicle from an idle mode to an active mode by a wireless signal transmitted from an apparatus, wherein a frequency and/or a channel is specified for transmitting and/or receiving the signal.

In the method according to the invention, provision may be made for the device of the motor vehicle or the apparatus to specify the frequency and/or the channel.

As an alternative, it is possible for a portable mobile handset to transmit and/or receive the wireless signal. This can preferably be provided and made available in addition to the device of the motor vehicle. By means of the portable mobile handset, it is thus possible for a user to send the wireless signal in order to shift the device of the motor vehicle into an idle mode or to switch it from an idle mode to an active mode. It is also possible that the portable mobile handset receives the specified frequency and/or the specified channel from the apparatus or device of the motor vehicle. This is necessary so that the device of the motor vehicle can also be shifted from the idle mode to the active mode, or vice versa, by means of the portable mobile handset.

A refinement of the method according to the invention provides that a function of the motor vehicle and/or the motor vehicle is controlled, preferably is parked, when a corresponding signal is received from the device of the motor vehicle.

This signal can be sent by the device or by the portable mobile handset. As a result, in a particularly preferred embodiment of the invention, a parking operation of the motor vehicle can be triggered. Thus, for example, the driver can trigger a preparation of his vehicle by means of the portable mobile handset, which is triggered by sending the wireless signal. This can be received by the apparatus or by the device of the motor vehicle. The device is switched from the idle mode to the active mode by receiving the wireless signal. Subsequently, the apparatus can trigger an out or in parking operation of the motor vehicle by means of a corresponding signal and can control this or its functions via corresponding signals.

Figure 2:
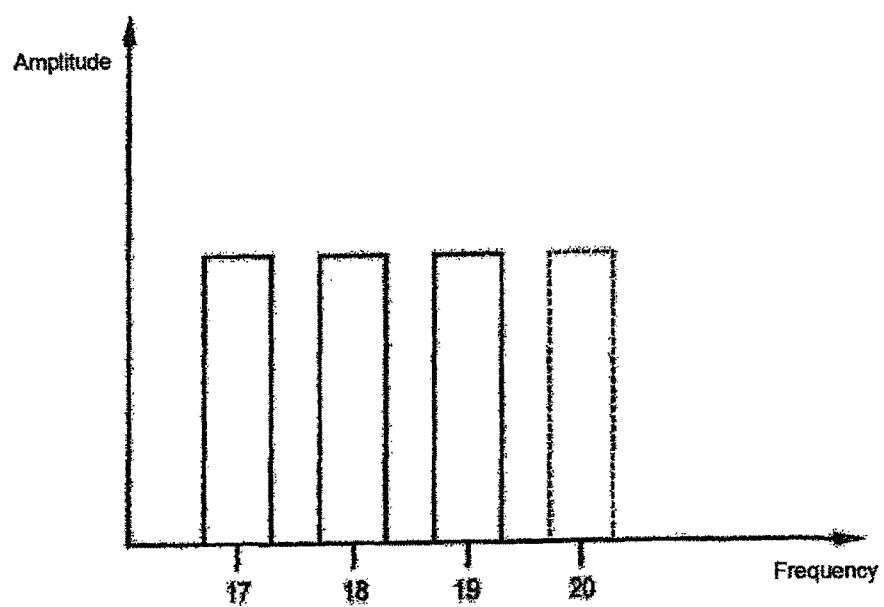

Further advantages and details of the invention are described based on exemplary embodiment with reference to the accompanying drawings. The drawings are schematic illustrations and show in:

FIG. 1 a plan view of a parking area with an apparatus according to the invention;

FIG. 2 a frequency diagram; and

Figure 3:
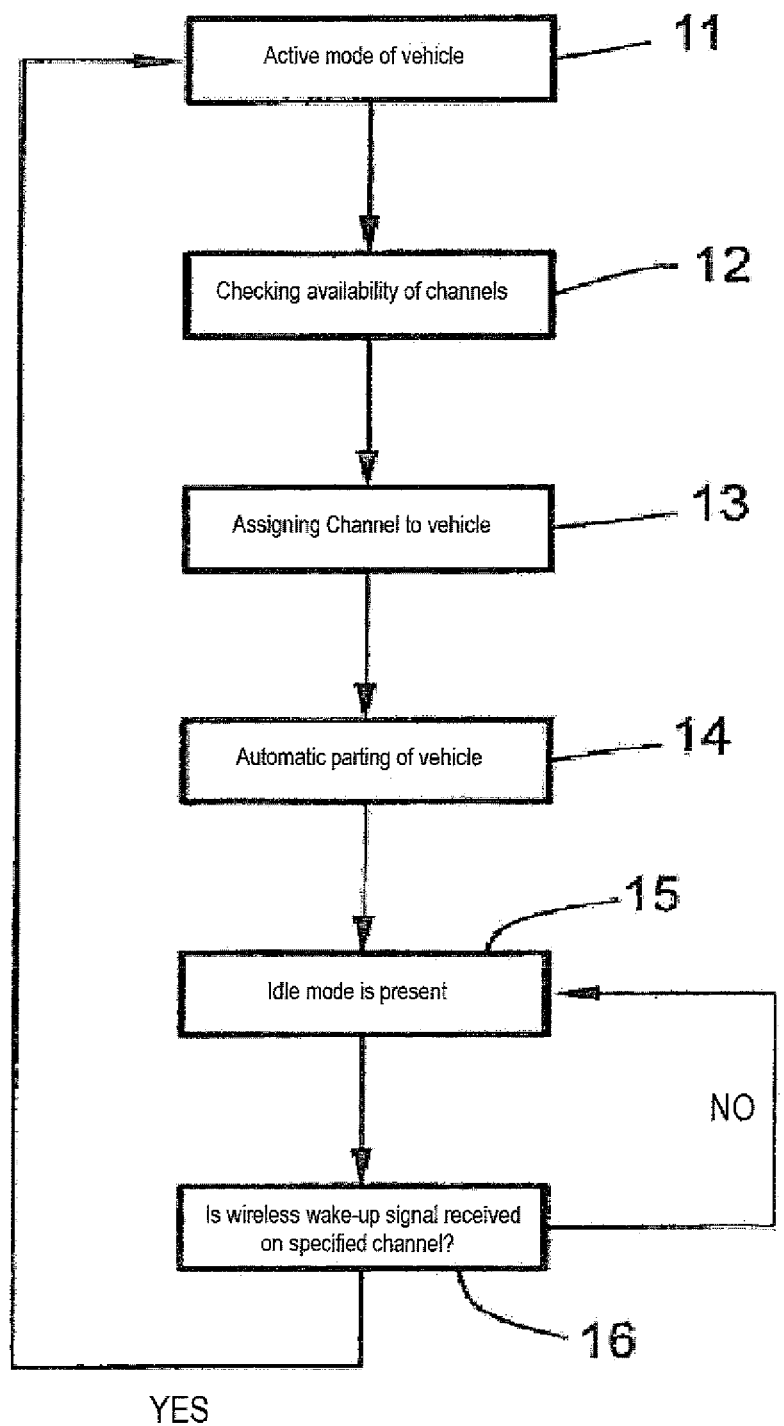

FIG. 3 a flowchart of the method according to the invention.

FIG. 1 shows a plan view of a parking area 21 with an apparatus 1 which has a communication unit 2 and a database 3. The apparatus 1 is hereby arranged in a fixed position on the parking area. In the region of the parking area 21, there are motor vehicles 4-7, each of which has a device 8. The motor vehicles 4 and 6 are parked in this case on parking spaces. In the situation shown in FIG. 1, the apparatus 1 controls the motor vehicle 5 in an automated parking operation. For this purpose, the apparatus 1 transmits a wireless signal to the device 8 of the motor vehicle 5 via its communication unit 2. The motor vehicles 4 and 6 are in the idle mode. These are not switched from the idle mode to an active mode by the transmission of the wireless signals of the communication unit 2 of the apparatus 1 to the motor vehicle 5, since the apparatus 1 has previously assigned a separate frequency 17-20 to each of the vehicles, which frequency is stored in the database 3 of the apparatus 1.

The different frequencies or the individual channels 17-20 of the motor vehicles 4-7 are readily apparent in FIG. 2. FIG. 2 shows a frequency diagram in which the four channels 17-20 of the four motor vehicles 4-7 are shown, wherein the frequency is shown on the horizontal axis and the amplitude of a signal is shown on the vertical axis. It can be seen that the frequency width of the individual channels (17-20) does not lead to an overlap. The frequency width of the individual channels (17-20) as well as the distance between the individual channels (17-20) to one another is only schematically shown here. The channel 20 is shown here by a dashed line, since it is free until the channel 20 is assigned to the motor vehicle 7, which is located in front of the parking area 21.

The automated parking operation in FIG. 1 is therefore implemented through the transmission of the wireless signal by the communication unit 2 of the apparatus 1 to the device 8 of the motor vehicle 5. Since the transmission occurs on the channel 18 of the motor vehicle 5, the devices 8 of the motor vehicles 4 and 6 are not switched from the idle mode to the active mode, since the channels 17 and 19 are assigned to them.

As soon as the automatic parking operation of the motor vehicle 5 is finished, the device 8 of the motor vehicle 5 is also shifted to the idle mode. This can be performed by the apparatus 1 or the device 8 or in a time-controlled manner.

The motor vehicle 7 is located in front of the parking area 21. In order to enable an automatic parking operation, the device 8 of the motor vehicle 7 communicates with the communication unit 2 of the apparatus 1. The apparatus 1 searches for a free transmission channel 20 in the database 3 and maps the motor vehicle 7 to the free space. The communication before the entry of the motor vehicle 7 into the database 3 can take place on a general transmission channel. After the motor vehicle 7 has been registered in the database 3 of the apparatus 1, the automatic parking procedure can be triggered. For this purpose, the channel 20 is assigned to the device 8 of the motor vehicle 7.

Furthermore, FIG. 1 shows that the driver 9 of the motor vehicle 6 is present in the region of the parking area 21 and has a portable mobile handset 10. According to this exemplary embodiment, the mobile handset 10 is configured as a mobile telephone. In the mobile handset 10, as in the database 3 of the apparatus 1, the channel 19 of the motor vehicle 6 is stored in a memory. This can be realized using the vehicle ID, such as the serial number. An assignment of motor vehicle 4-7 and channel 17-20 is thus possible. The driver 9 transmits a wireless signal to the communication unit 2 of the apparatus 1 by means of the mobile handset 10 in order to trigger a parking out operation of the motor vehicle 6. In this case, the wireless signal is transmitted on the frequency or the channel 16, which is stored for the motor vehicle 6 in the database 3 of the apparatus 1 as well as the mobile handset 10. By receiving the wireless signal, the apparatus 1 is able to automatically park out the motor vehicle 6. For this purpose, the communication unit 2 of the apparatus 1 transmits the wireless signal to the channel 16, which is stored in the database 3 for the motor vehicle 6. The device 8 of the motor vehicle 6 receives this signal and switches the device from an idle mode to the active mode. The automatic parking out operation can be performed in this active mode.

The vehicles 4 and 5 are not shifted to the active mode from the idle mode, since they are not on reception with respect of the channel 16, which is reserved for the motor vehicle 6. This avoids an additional demand on the vehicle battery since the vehicles can remain in the idle mode until their wake-up signal is sent on their frequency 17 or 19.

FIG. 3 shows a flowchart of the method. The method starts in block 11, which represents the active mode of the motor vehicle 7. From the active mode in block 11, it is transferred to the block 12, in which a query is transmitted from a device 8 of the motor vehicle to the communication unit 2 of the apparatus 1. In block 12, the apparatus 1 checks which channel is available in the database 3. In this case, the database 3 has sufficient free channels 17-20 so that all parking spaces of the parking area 21 can be assigned. Thus, when the database 3 has exactly the same number of channels as parking spaces, the situation where no channel is free for a vehicle would then only be possible when the parking area 21 is already fully occupied.

If this is not the case, block 12 goes to block 13. A free channel 20 is thereby assigned to the motor vehicle 7 and this is specified. This is entered in the database 3 and stored on the vehicle side, for example, in the communication unit 2 of the apparatus 1. The apparatus 1 can have additional options in which the corresponding channel 20 is specified and entered, such as, e.g., a control device. When the driver of the motor vehicle 7 has a mobile handset 10, the corresponding channel 20 is also entered there. Subsequently, the flow chart moves from block 13 to block 14, in which an automatic parking of the motor vehicle 7 is performed. Since all the control commands are preferably transmitted on the same channel 20 which has been specified for the device 8 of the motor vehicle 7, there is no fault in the form of a shifting of the remaining motor vehicles 4-6 from the idle mode to the active mode since the channels 17-19 are assigned to them.

Accordingly, transfer is made from block 14 to block 15, in which the idle mode is present. In this case, it goes from block 15 to block 16, in which it is checked whether a wireless signal for wake-up is received on the channel 20, i.e., for shifting the device 8 of the motor vehicle 7 from the idle mode to the active mode. If this is not the case, block 16 branches to block 15, in which the idle mode is still present. Thus, the idle mode is maintained until the signal for wake-up is received in block 16. If this is the case, there is branching from block 16 to block 11, i.e. the motor vehicle 7 shifts from the idle mode to the active mode. The automatic exiting from the parking space can now be initiated.

The invention claimed is:

1. Apparatus for controlling devices of a plurality of motor vehicles present in a parking area, said apparatus comprising:
    a communication unit configured to shift one or more respective devices of the plurality of motor vehicles from an idle mode to an active mode by sending one or more respective first wireless signals, and
    a database containing channels used in the parking area, and
    a server configured to assign one or more free channels respectively to the one or more devices of the plurality of motor vehicles,
    said apparatus configured to use the assigned channels for transmitting and receiving the one or more respective first wireless signals in the active mode, the assigned channels being specified by the respective devices, and
    shifting the one or more respective devices from the idle mode to the active mode only when the one or more respective first wireless signals are received at the respective assigned channels,
    wherein in the active mode the apparatus autonomously drives and parks the motor vehicle using the free channels, the motor vehicle being switched to the active mode and the idle mode in response to the motor vehicle being assigned or not assigned a first channel of the one of more channels, wherein when the motor vehicle is assigned the first channel of the one or more channels, the motor vehicle in response to the assignment is switched to the active mode for automatic parking, and wherein when the motor vehicle is not assigned the first channel of the one or more channels, then the motor vehicle is maintained in the idle mode.

2. The apparatus of claim 1, arranged stationary outside of the motor vehicle.

3. The apparatus of claim 1, wherein the communication unit is configured to park one or more of the motor vehicles via one or more respective second wireless signals using the respective assigned channels.

4. A system, comprising:
    a device provided in a motor vehicle located in a parking area; and
    an apparatus including a communication unit configured to shift one or more respective devices of a plurality of motor vehicles from an idle mode to an active mode by sending one or more respective first wireless signals,
    a database containing channels used in the parking area, and
    a server configured to assign one or more free channels respectively to the one or more devices of the plurality of motor vehicles,
    said apparatus configured to use the assigned channels for transmitting and receiving the one or more respective first wireless signals in the active mode, the assigned channels being specified by the respective devices, and
    shifting the one or more respective devices from the idle mode to the active mode only when the one or more respective first wireless signals are received at the respective assigned channels,
    wherein in the active mode the apparatus autonomously drives and parks the motor vehicle using the free channels, the motor vehicle being switched to the active mode and the idle mode in response to the motor vehicle being assigned or not assigned a first channel of the one of more channels, wherein when the motor vehicle is assigned the first channel of the one or more channels, the motor vehicle in response to the assignment is switched to the active mode for automatic parking, and wherein when the motor vehicle is not assigned the first channel of the one or more channels, then the motor vehicle is maintained in the idle mode.

5. The system of claim 4, further comprising a portable mobile handset configured to transmit and receive the one or more respective first wireless signals in addition to the apparatus.

6. The system of claim 4, wherein the one or more respective first wireless signals are receivable by the respective devices only at the respective assigned channels for the motor vehicles to be shifted from the idle mode to the active mode.

7. A method, comprising:
  assigning respective channels for transmitting and sending one or more respective first wireless signals from an apparatus to respective devices of a plurality of motor vehicles located in a parking area, the assigned channels being specified by the respective devices,
  configuring the respective devices such that the one or more respective first wireless signals are receivable by the respective devices only at the respective assigned channels; and
  sending one or more first wireless signals to the respective devices, and
  shifting respectively one or more motor vehicles from an idle mode into an active mode,
  wherein in the active mode the apparatus autonomously drives and parks the motor vehicle using the free channels, the motor vehicle being switched to the active mode and the idle mode in response to the motor vehicle being assigned or not assigned a first channel of the one of more channels, wherein when the motor vehicle is assigned the first channel of the one or more channels, the motor vehicle in response to the assignment is switched to the active mode for automatic parking, and wherein when the motor vehicle is not assigned the first channel of the one or more channels, then the motor vehicle is maintained in the idle mode.

8. The method of claim 7, further comprising allowing a portable mobile handset or the apparatus to transmit and receive the one or more respective first wireless signals.

9. The method of claim 7, further comprising parking the one or more respective motor vehicles when one or more respective second wireless signals at the respective assigned channels are received by the device.

10. The apparatus of claim 1, wherein the communication unit, using the assigned channels, is configured to activate one of the motor vehicle functions selected from the group consisting of heating, air conditioning and multimedia.

11. The method of claim 7, further comprising activating one of the motor vehicle functions selected from the group consisting of heating, air conditioning and multimedia.

* * * * *